United States Patent [19]

Tar

[11] Patent Number: 4,464,953

[45] Date of Patent: Aug. 14, 1984

[54] DIFFERENTIAL LOCKING DEVICE WITH THREE-POINT SUPPORT, PARTICULARLY FOR THE CARRIAGE OF PUBLIC VEHICLES

[75] Inventor: Lóránt Tar, Györ, Hungary

[73] Assignee: Magyar Vagon és Gépgyár, Györ, Hungary

[21] Appl. No.: 311,789

[22] Filed: Oct. 15, 1981

[30] Foreign Application Priority Data

Dec. 23, 1980 [HU] Hungary ................................ 3087/80

[51] Int. Cl.³ ............................................. F16H 1/44
[52] U.S. Cl. .................................... 74/710.5; 192/99 S
[58] Field of Search ...................... 74/710.5; 192/99 S, 192/85 C

[56] References Cited

U.S. PATENT DOCUMENTS

| | | | |
|---|---|---|---|
| 986,363 | 3/1911 | Collins | 192/99 S X |
| 1,511,908 | 10/1924 | Pickering | 74/710.5 |
| 1,690,189 | 11/1928 | Dennison | 74/710.5 |
| 2,770,150 | 11/1956 | Culverwell | 192/67 R X |
| 3,195,371 | 7/1965 | Christie | 74/710.5 |
| 3,400,610 | 9/1968 | Taylor et al. | 192/99 S X |
| 3,498,154 | 3/1970 | Müller-Berner | 74/710.5 |
| 3,871,249 | 3/1975 | Jeffers | 74/710.5 |

FOREIGN PATENT DOCUMENTS

| | | | |
|---|---|---|---|
| 1922913 | 11/1970 | Fed. Rep. of Germany | 192/99 S |
| 982838 | 6/1951 | France | 74/710.5 |
| 1041322 | 10/1953 | France | 74/710.5 |
| 2343401 | 11/1977 | France | 74/710.5 |
| 936830 | 9/1963 | United Kingdom | 74/710.5 |
| 1017911 | 1/1966 | United Kingdom | 74/710.5 |
| 1382926 | 5/1972 | United Kingdom | 74/710.5 |

Primary Examiner—Allan D. Herrmann
Assistant Examiner—D. Wright
Attorney, Agent, or Firm—Gabriel P. Katona

[57] ABSTRACT

There is disclosed in a differential locking device with three-point support for a carriage of a vehicle having a bridge housing, a fork-shaped clutch lever therein symmetrical about a line therealong with a fork-shaped end and a shank and connected to a clutch hub by a sliding-ring, the device including a pushrod connected to a clutch lever and actuated by an air chamber, wherein self adjusting means are provided which connect one end of the clutch lever shank to the bridge housing and connecting the fork-shaped end to the clutch hub and means mounting the pushrod on the bridge housing between the connections to the fork-shaped end and the shank of the clutch lever at the line of symmetry of the clutch lever, which is a grooved bush mounted in the clutch lever and receptive of the pushrod and a catch spring for fixing the grooved bush into the clutch lever and the pushrod into the grooved bush.

3 Claims, 5 Drawing Figures

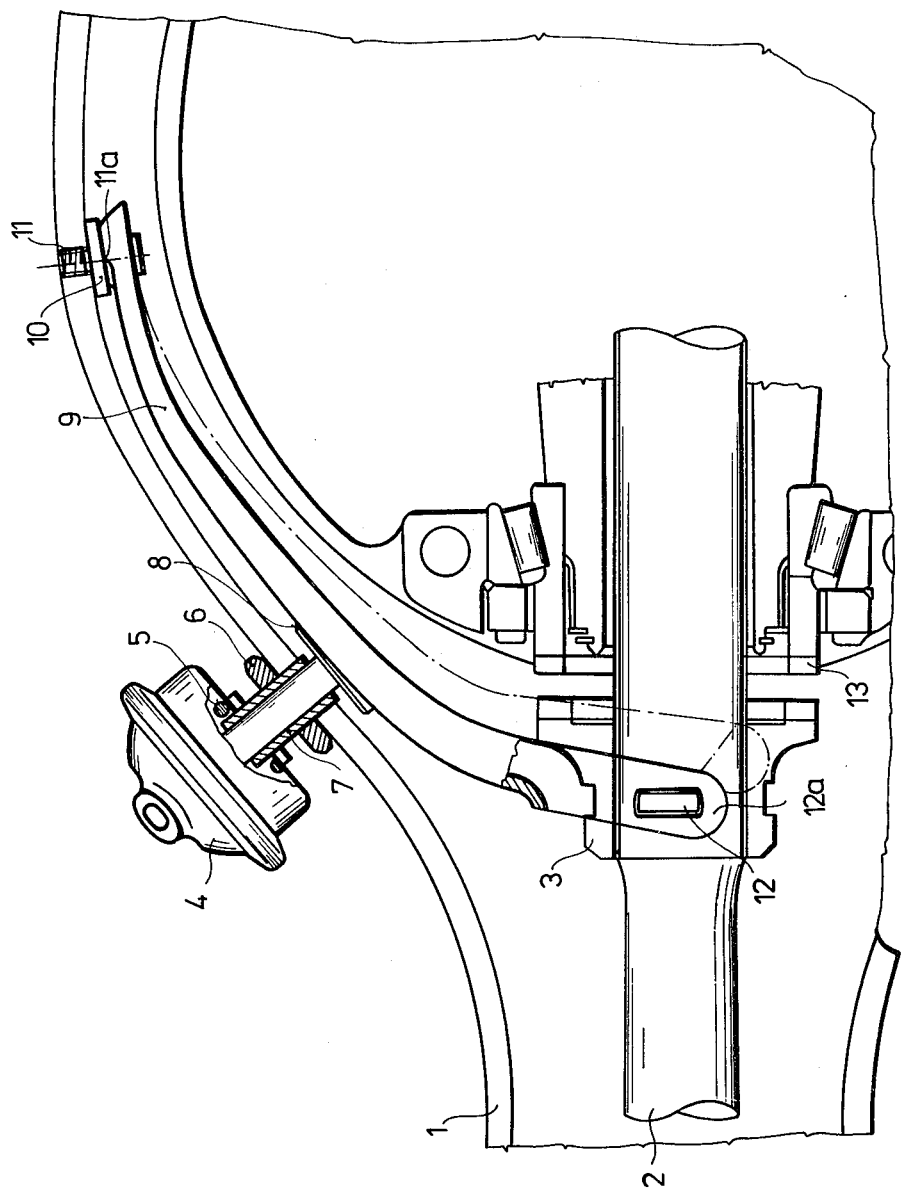

DIFFERENTIAL LOCKING DEVICE WITH THREE-POINT SUPPORT, PARTICULARLY FOR THE CARRIAGE OF PUBLIC VEHICLES

The invention relates to a differential locking device with three-point support, particularly for the carriage of public vehicles in which inside the bridge housing a fork-shaped clutch lever is arranged and connected to a clutch hub by means of a sliding-ring, and the device includes a pushrod connected to the clutch lever and actuated by an air chamber.

Several solutions of the traditional differential locking devices are known, but all of them are similar in that respect, whereby the fork pushing the clutch hub has an external guide independently from the clutch hub.

Fault of the external guide is that even in case of high production accuracy it may occur, that varying force effect appears on the fork shanks, bringing about torque that causes tightness on the sliding ring. This tightness increases the friction force and requires increased coupling force. More accurate guiding of the coupling fork can be accomplished only with stricter production requirements, thereby considerably increasing the expenditures, while despite the careful production and increasing production cost, the faults of the external guiding can be only reduced but not eliminated.

According to the general experience, the solutions of the differential locking devices so far have been the most poorly designed and constructed parts of the carriages of public vehicles.

There is no possibility to describe all the devices available in the market, yet the description of a widely used device is advisable in order to demonstrate the foregoing.

According to the general and traditional solution the membrane air chamber mounted on the bridge housing actuates a rod gear against a spring, which rod gear is bearing supported at two points in the bridge housing. The fork of the clutch lever mounted on the rod gear is connected to the clutch hub movable on the half-shaft.

In this case the fault of this coupling is, that the machining of the bridge housing—holes of the rod gear bearing—are nearly independent from the position (parallelism) of the half-shaft as far as the interconnection is concerned, since the number of the interconnecting elements is very large. From this it follows that adherence even to the strictest tolerance limit will not ensure the perfect parallelism of the rod gear and half-shaft.

The lack of parallelism in these cases influences adversely the fork of the clutch lever, which effect is even increased by the wear arising during operation.

The other known solutions have similar fault, since production without tolerance is not possible and at such device the forces arising on the fork shanks of the clutch lever will always be different. Consequently stress and increasing wear will appear as undesirable results.

The aim of the present invention is to realize a suitably designed device, that is free from redundant constraint, hence it is a statically stable device functioning at minimum production cost and optimal efficiency even in case of components produced with less strict requirements as usual.

This aim is achieved according to the invention by a differential locking device with three-point support particularly for the carriage of public vehicles in which inside the bridge housing a fork-shaped clutch lever is arranged and connected to a clutch hub by means of a sliding-ring, and the device includes a pushrod connected to the clutch lever and actuated by an air chamber, the essence of which is that one end of the clutch lever shank arranged within the bridge housing in a self-adjustable way is connected to the bridge housing, while the other fork-shaped end is connected to the clutch hub, furthermore that the rod gear controlled by the air chamber and connected to the clutch lever is mounted on the bridge housing between said two connection points in the symmetry-line of the clutch-fork between the suspension point of the clutch lever and the clutch-fork.

In a preferred embodiment a grooved bush mounted in the clutch lever is provided for the automatic coupling of the pushrod of the air chamber and a catch spring is provided to fix the grooved bush into the clutch lever and the pushrod of the air chamber into the grooved bush.

In an other preferred embodiment in order to ensure the self alignment, a ball socket is formed at the end of the clutch lever and said ball socket of the clutch lever is fixed to the bridge housing by means of a shell-formed washer and a spherical screw.

In an other preferred embodiment in order to ensure the self-alignment and for fixing the clutch lever to the bridge housing it is provided with a stepped screw with a washer on the stepped screw, rubber discs between the washer and the bridge housing and the clutch lever is surrounded by the rubber discs.

Due to the fact that the clutch lever is guided on the engaging piece instead of an external guiding, the redundant constraint arising from the external guiding is eliminated. Taking into consideration the bearing of the two fork shanks of the clutch lever, a freely aligning hinged member (ball joint or rubber coupling) is arranged as a third supporting point in such a way, that the force actuating the clutch lever should arise along the symmetry line within the triangle formed by said three points.

In this way the self-adjustability of the clutch lever is ensured and the tightness is eliminated.

An other advantage of the invention is that the pushrod of the air chamber is fixed to the clutch lever with a spring arranged in the grooved bush. The solution ensures that the mounting and dismounting of the brake chamber are the most simple, when the threaded part of the brake chamber is driven into the threaded hole prepared at the corresponding place of the bridge housing. By driving forward the pushrod of the air chamber the mounting is completed, since the rounded end of the pushrod penetrates into the hole of the grooved bush, where it is fixed by the spring.

The dismounting of the air chamber includes the release of the lock nut, its removal from the threaded hole and pulling out the pushrod in axial direction.

The easy mounting method and the reliable actuation of the differential locking device brought about by the invention, give a simple and inexpensive solution, especially suitable for the carriage of heavy duty public vehicles.

Operation of the invention is shown in the following drawings:

FIG. 1 shows an assembly plan of a suitable embodiment of the invention,

Figure 3:
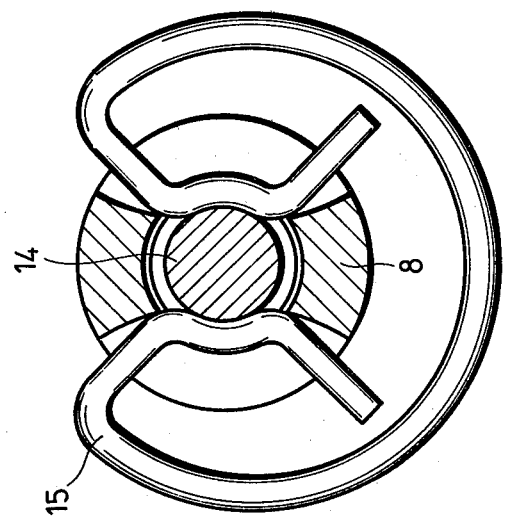
FIG. 3 shows a section along line A—A in FIG. 2.

As shown in FIG. 1 the clutch lever 9 of the differential locking device according to the invention is arranged within a bridge housing 1 and is connected to the bridge housing 1 with a spherical screw 11 in order to ensure the alignment. This connection point is nominated later as suspension point 11a. One end of the clutch lever 9 is connected to the bridge housing 1, the other end to a pressure plate 12 of a claw clutch hub 13, which carries out the coupling of the differential lock with the coupling force transmitted by the clutch lever 9. The two pressure plates 12 are arranged on the end of the clutch fork 12a.

An air chamber 4 is mounted on the bridge housing 1. The pushrod 14 of the air chamber 4 is easily releasable coupled to the clutch lever 9, in order to facilitate the assembly. The air chamber 4 is mounted on the bridge housing 1 with a threaded sleeve 7 and it is fixed with a counter nut 6.

The clutch lever 9 is actuated by the pushrod 14 against a pullback spring 5. The pushrod 14 is connected by a catch spring 15 through a grooved bush 8 to the clutch lever 9.

Figure 2:
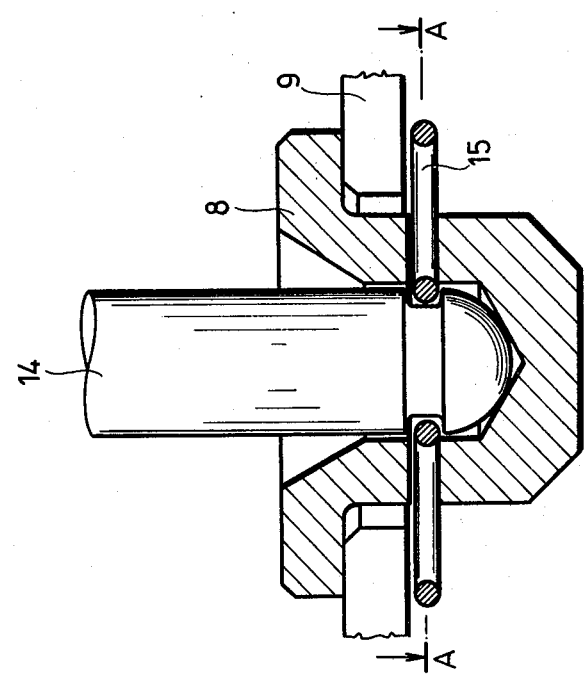
FIG. 2 shows the connection of the pushrod of the air chamber.

A suitable embodiment of the catch spring 15 is shown in FIG. 2.

The catch spring 15 fits into a groove of the pushrod 14, whereby it fixes on the one hand the pushrod 14 of the air chamber 4 into the suitably formed grooved bush 8, on the other hand it fixes the grooved bush 8 into the hole of the clutch lever 9. The hole of the clutch lever 9 is substantially larger than the diameter fitting into the grooved bush 8 in order to avoid possible tightness and to ensure the aligning possibility.

Figure 4:
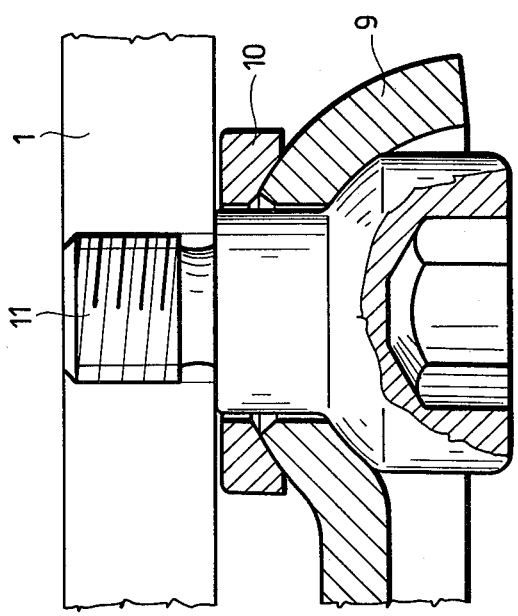
FIG. 4 shows a ball and socket joint of the clutch lever.

FIG. 4 shows details of the connection between the clutch lever 9 and bridge housing 1. At this solution there is a shell-formed washer 10 between the bridge housing 1 and the clutch lever 9. Into this shell-formed washer 10 are fitted the spherical end of the clutch lever 9 and the spherical screw 11, which connects the clutch lever 9 with the bridge housing 1, while ensuring the movement on the spherical surface. The large hole of the clutch lever 9 enables the alignment of the sphere.

Figure 5:
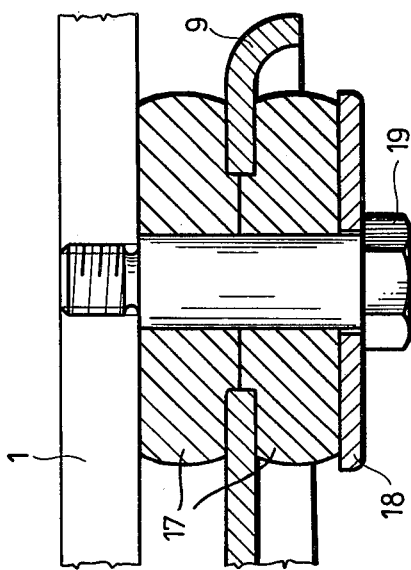
FIG. 5 shows a coupling of the clutch lever with rubber disc.

FIG. 5 shows a simplified embodiment of the solution shown in FIG. 3, where the end of the clutch lever 9 has no spherical form and the clutch lever 9 is actuated with the arrangement of rubber discs 17. At this solution the clutch lever 9 is fixed between several rubber discs 17 to the bridge housing 1 by means of a shouldered screw 19 in such a way, that the flexibility of the rubber disc—or discs—17 ensures the required shifting of the clutch lever 9.

The solutions according to the invention shown in the drawings are of suitable construction, which can be realized in other forms as well within the scope of the invention.

These solutions do not evade the substance of the invention, whereby the invention contains the solution of such differential locking device which solves the actuation of the differential locking device in a safer and simpler way than the solutions known so far.

I claim:

1. In a differential locking device with three-point support for a carriage of a vehicle having a bridge housing, a fork-shaped clutch lever therein symmetrical about a line therealong with a fork-shaped end and a shank and connected to a clutch hub by a sliding-ring, the device including a pushrod connected to the clutch lever and actuated by an air chamber, the improvement comprising: self-adjusting means connecting one end of the clutch lever shank to the bridge housing and connecting the fork-shaped end to the clutch hub and means mounting the pushrod on the bridge housing between the connections to the fork-shaped end and the shank of the clutch lever at the line of symmetry of the clutch lever, comprising a grooved bush mounted in the clutch lever and receptive of the pushrod and a catch spring for fixing the grooved bush into the clutch lever and the pushrod into the grooved bush.

2. The differential locking device as claimed in claim 1, wherein the self-adjusting means comprises a ball socket formed at the shank end of the clutch lever and a shell-formed washer and a spherical screw fixing the ball socket to the bridge housing.

3. The differential locking device as claimed in claim 1, wherein the self-adjusting means comprises a stepped screw, a washer, rubber discs between the washer and the bridge housing and surrounding the clutch lever.

* * * * *